United States Patent [19]

Oestreich et al.

[11] Patent Number: 4,841,103

[45] Date of Patent: Jun. 20, 1989

[54] ARRANGEMENT FOR THE CONNECTION OF AN INTERMEDIATE REPEATER FOR SUBMARINE CABLES

[75] Inventors: Ulrich Oestreich, Munich; Wolfgang Giebel, Traubing, both of Fed. Rep. of Germany

[73] Assignee: Siemens Aktiengesellschaft, Berlin and Munich, Fed. Rep. of Germany

[21] Appl. No.: 226,881

[22] Filed: Aug. 1, 1988

[30] Foreign Application Priority Data

Aug. 7, 1987 [DE] Fed. Rep. of Germany ....... 3726358

[51] Int. Cl.$^4$ .................. H04B 3/44; H02G 15/14; H02G 9/02; H01B 11/16
[52] U.S. Cl. ................... 174/70 S; 174/71 R; 455/601
[58] Field of Search ............... 174/70 R, 70 S, 71 R, 174/72 R; 181/110, 112; 367/20, 154, 177; 439/624; 254/134.3 SC; 379/338; 340/425; 455/601

[56] References Cited

U.S. PATENT DOCUMENTS

| | | | |
|---|---|---|---|
| 2,155,650 | 4/1939 | Gilbert | 174/70 S |
| 2,551,417 | 5/1951 | Carlisle | 174/70 S X |
| 3,270,312 | 8/1966 | Olsen | 174/70 S X |
| 3,866,162 | 2/1975 | Florian | 174/71 R X |
| 3,923,121 | 12/1975 | Kruppenbach et al. | 439/624 X |

*Primary Examiner*—Laramie E. Askin
*Attorney, Agent, or Firm*—Hill, Van Santen, Steadman & Simpson

[57] ABSTRACT

An arrangement is provided for the connection of an intermediate repeater for submarine cables, whereby the intermediate repeater is looped into the signal lines of a main cable and is connected to supply lines. The intermediate repeater is looped via an umbilical cord cable which branches off from the main cable.

13 Claims, 2 Drawing Sheets

ARRANGEMENT FOR THE CONNECTION OF AN INTERMEDIATE REPEATER FOR SUBMARINE CABLES

BACKGROUND OF THE INVENTION

1. Field of the Invention:

The present invention relates to an arrangement for the connection of an intermediate repeater for submarine cables, whereby the intermediate repeater is looped into the signal lines of the main cable and is connected to supply lines.

2. Description of the Prior Art

The utilization of intermediate repeaters is absolutely necessary in order to regenerate the signals at defined intervals in the transmission of signals over greater distances by means of a submarine cable, particulary in light waveguide technology. Previous submarine cable technology has provided partially flexible, pressure-resistance joint boxes for the intermediate repeaters, these joint boxes being spliced into the submarine cable to be supplied in tensile fashion, pressure-resistant and with suitable insulation for the current conductors (supply lines). This technology that has remained unaltered for many years, in fact, has the advantage of being able to lay intermediate repeaters and cables as a unit, but has a serious disadvantage given repairs required at the intermediate repeater of having to raise the same together with the cable proceeding on the ocean floor. In addition, it makes it indispensible to build the repeater in a compact and flexible fashion, so that extremely difficult and involved developments are necessary in order to being it into the required, oblong, space-saving shape. Particularly given repeaters for optical systems, one must count on a limited life expectancy of the transmitting laser diodes that will require maintenance work at the intermediate repeaters. On the other hand, the repeater spacing is constantly increasing with the development of decreasing fiber attenuation and increasing diode transmission powers, so that the utilization of the transmission diodes, in fact, becomes higher, but the overall maintenance expense is more likely to decrease.

SUMMARY OF THE INVENTION

The object of the present invention is to provide an intermediate repeater, located on the floor of an ocean, accessible for maintenance and repair in a simple manner.

In an arrangement of the type set forth above, the above object is achieved in that an umbilical cord cable branching off from the main cable via a connecting element is arranged for looping in the intermediate repeater.

Since the intermediate repeater is not directly integrated in the main cable or, respectively, spliced thereto, but is looped into an umbilical cord branching from the main cable via a connector element, the intermediate repeater can be raised for maintenance purposes without having to raise the main cable. Since the main cable thereby remains on the ocean floor, maintenance work at the intermediate repeater can be carried out in a simple manner by merely raising the umbilical cord.

In accordance with an advantageous development of the invention, the repeater housing comprises an arbitrarily-shaped, pot-like form. A structure of the intermediate repeater that is more simple and independent of the dimensions of the main cable is thereby enabled.

According to a particular feature of the invention, the intermediate repeater is, as mentioned above, the accommodated at the remote end of the umbilical cord in a pressure-resistant repeater housing.

According to another feature of the invention, the remote end of the umbilical cord is connected to the sealed repeater housing in a tensile fashion.

According to another feature of the invention, the repeater housing comprises an arbitrarily-shaped pot-like form, as mentioned above.

According to another feature of the invention, the umbilical cord is fashioned as a tensile special cable whose length corresponds to at least a greater laying depth that occurs in a particular situation.

According to another feature of the invention, the umbilical cord contains all entering and departing signal lines, as well as the entering and departing supply lines.

According to another feature of the invention, the connector element is fashioned as a tension-resistant and pressure-resistant branch sleeve, particularly in the form of a T-element.

According to another feature of the invention, the branch sleeve comprises two openings lying on an axis for receiving a main cable entry or, respectively, outlet and also comprises an opening for the acceptance of the umbilical cord that lies transversely relative to this axis.

According to another feature of the invention, the main cable and the umbilical cord are connected to the branch sleeve in a tension-resistant fashion and are impenetrable for the surrounding medium, particularly water.

According to another feature of the invention, the signal lines and supply lines extending within the branch sleeve are stripped of the armoring of the main cable.

According to another feature of the invention, the branch sleeve is cast in a pressure-resistant fashion iwth silicone resin or PV resin.

According to another feature of the invention, the auxiliary cable has a marker for locating the intermediate repeater and is attached to the repeater housing.

According to another feature of the invention, the marker is fashioned as a floatable buoy at the end of the auxiliary cable.

BRIEF DESCRIPTION OF THE DRAWINGS

Other objects, features and advantages of the invention, its organization, construction and operation will be best understood from the following detailed description, taken in conjunction with the accompanying drawings, in which.

DESCRIPTION OF THE PREFERRED EMBODIMENTS

Figure 1:
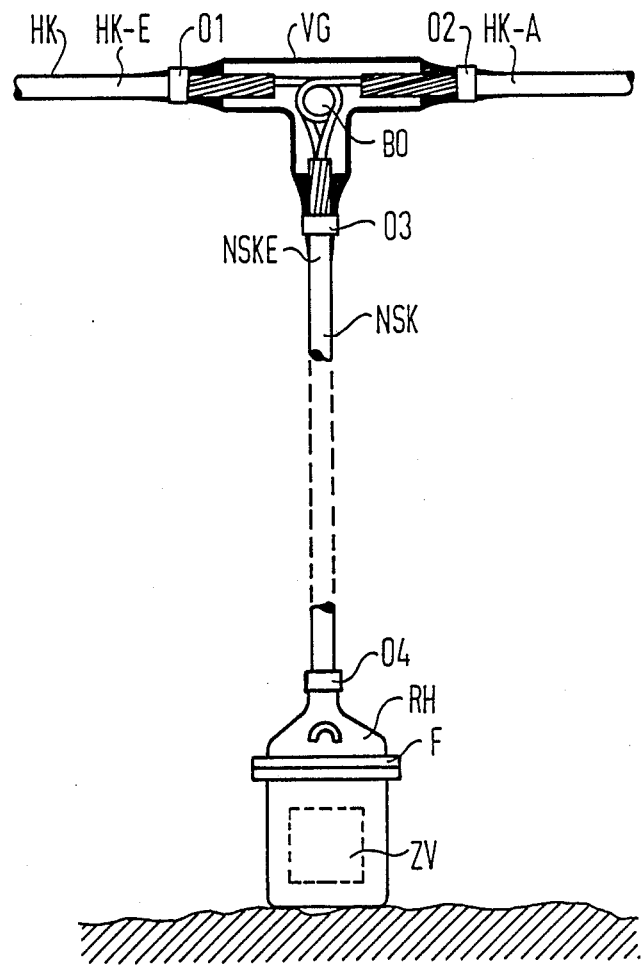
FIG. 1 is a schematic view of an arrangement constructed in accordance with the invention and comprising a main connector element, an umbilical cord cable and an intermediate repeater.

FIG. 1 illustrates a submarine cable HK connected to a connector element VG and an umbilical cord cable NSK branching from the connector element VG, a pot-like pressure-resistant repeater housing RH that contains the intermediate repeater ZV being secured to the end of the umbilical cord cable NSK. The connector element VG is constructed as a flat tension-resistant and pressure-resistant branch sleeve, particularly in the form of a T-element. Connecting the main cable HK to a tension-resistant and pressure-resistant T-housing is more simple than connecting a flexible coupler that is spliced in, since the one that is a mere connecting sleeve is short and can therefore be kept rigid. It is possible to use a rigid T-shaped housing and to cast the same out in a pressure-resistant form. The two openings 01 and 02 of the branch sleeve that lie on an axis accept the main cable entry HK-E or, respectively, the main cable outlet HK-A of the main cable HK in a tension-resistant fashion. The opening 03 lying transversely or obliquely relative to this axis serves for the tension-resistant acceptance of an end NSKE of the umbilical cord cable NSK. The coupling of the main cable HK and the umbilical cord cable NSK to the branch sleeve, furthermore, occurs such that an impenetrability of the surrounding medium, for example water, occurs. The sealed ends HK-E, HK-A and NSKE of the main cable HK or, respectively, of the umbilical cord NSK entering into the branch sleeve are stripped of their outer protective jackets within the branch sleeve. The signal lines and supply lines of the main cable entry HK-E are thereby deflected by way of a pin BO located in the middle of the branch sleeve into the umbilical cord NSK and extend therethrough to the intermediate repeater ZV. The signal lines and reply lines departing the latter, in turn, pass through the umbilical cord NSK and extend into the main cable outlet HK-A in the branch sleeve after guidance by way of the pin BO. The umbilical cord NSK therefore contains all entering and departing signal lines and supply lines, i.e. it is traversed twice by the optical signal and by the supply current. When a current transformer is placed into the branch sleeve, the expense for copper and insulation in the umbilical cord can be greatly reduced. The repeater housing RH protecting the intermediate repeater ZV can be constructed as an arbitrarily-shaped, pressure-resistant pot that need hardly adapt to the dimensions of the umbilical cord NSK. The design of the intermediate repeater ZV becomes considerably simplified in this manner since no shape-defining housing need be used. The end of the umbilical cord NSK entering into the repeater housing RH is connected to the entry opening 04 of the repeater housing RH in a tension-resistant and pressure-resistant manner, as well as a water-impenetrable manner. The sealed repeater housing has a central opening flange F in order to be able to expose the intermediate repeater for maintenance and repair jobs without problem. The length of the umbilical cord NSK, constructed as a tensile-special cable, corresponds to at least the greatest laying depth that occurs. The cross-section of the supply lines extending in the umbilical cord cable NSK can thereby be less than in the main cable HK since the length of the umbilical cord cable NSK will amount to, at most, 7500 m in the extreme case.

Figure 2:
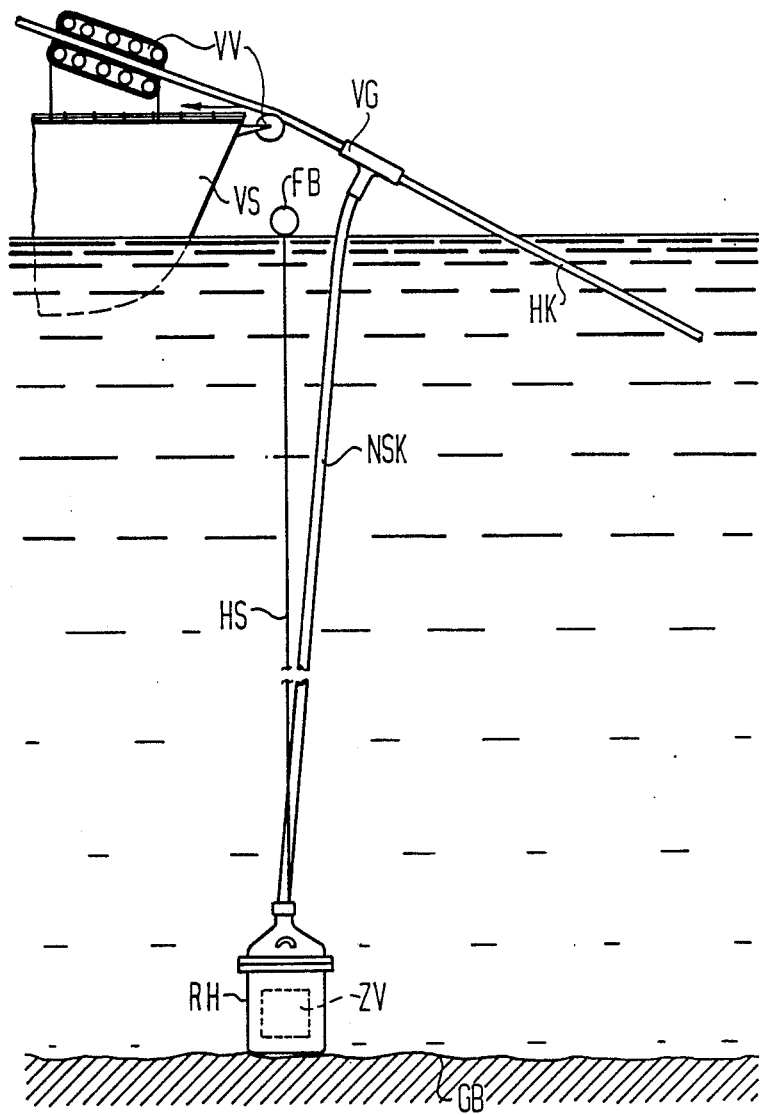
FIG. 2 is a schematic illustration of the laying of a submarine cable comprising the arrangement of the invention.

FIG. 2 illustrates a laying possibility of the arrangement of the present invention of a main cable HK and the umbilical cord cable NSK comprising a connected repeater ZV connected thereto via a connector element VG. During laying, one thereby proceeds such that the main cable HK, together with the connector element VG, is moved through the laying apparatus VV (caterpullar). Without moving the laying ship VS, the intermediate repeater ZV, together with the umbilical cord NSK are then lowered onto the ocean floor GB. As soon as the intermediate repeater ZV lies on the ocean floor GB, the laying ship VS resumes traveling for further laying of the cable HK. It is advantageous to secure an auxiliary cable HS to the repeater housing RH, the length of the auxiliary cable HS corresponding approximately to the laying depth. A floatable marker can be secured to the distal end of the auxiliary cable HS, this facilitating a locating of the intermediate repeater ZV. A floating buoy FB can be advantageously used as a marker, whereby a locating above or under the water is possible dependent on the length of the auxiliary cable HS. This arrangement enables the locating of the intermediate repeater AV in a simple manner and the intermediate repeater ZV can be raised for maintenance purposes without having to raise the main cable HK.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A submarine intermediate repeater station for repeating intelligible data comprising:
    a main cable through which is intelligible data can be transmitted;
    repeater means for accepting data signal inputs and repeating said data signal inputs therethrough to form data signal outputs;
    connector means dividing said main cable into a main cable input section and a main cable output section; and
    an umbilical cable connected to and proceeding from said connector means for transmitting signals in said main cable input section to said repeater means and transmitting output signals generated by said repeater means therefrom to said main cable output section, said umbilical cable having a length sufficient so as to allow surface repair of said repeater means without thereby disturbing said main cable.

2. A submarine intermediate repeater station as recited in claim 1, wherein said repeater means comprises a pot-shaped housing.

3. A submarine intermediate repeater station as recited in claim 1, wherein said connector means comprises a T-shaped branch sleeve which is both pressure and tension resistant.

4. A submarine intermediate repeater station as recited in claim 3, wherein said T-shaped branch sleeve has a first opening accepting said main cable input section therein, a second opening located axially with and opposite side first opening accepting said main cable output section therein, and a third opening located transverse to the axis of said first and second openings accepting therein said umbilical cable.

5. A submarine intermediate repeater station as recited in claim 3, wherein said branch sleeve is formed from a silicone resin.

6. A submarine intermediate repeater station as recited in claim 3, wherein said branch sleeve is formed from a PV resin.

7. A submarine intermediate repeater station as recited in claim 1 further comprising:

an auxiliary cable connected at one end thereof to said repeater means; and marker means connected to the end of said auxiliary cable opposite said repeater means for indicating the position of said repeater means.

8. A submarine intermediate repeater station as recited in claim 7 wherein said marker means is a floatable buoy.

9. A submarine intermediate repeater station as recited in claim 1, wherein said repeater means is capable of repeating optical signals.

10. A submarine intermediate repeater station for repeating intelligible data comprising:

first and second main cable sections through which intelligible data can be transmitted;

connector means disposed between said first and second main cable sections and maintaining a fixed positional alignment therebetween;

repeater means for accepting data signal inputs and repeating said data signal inputs therethrough to form data signal outputs; and an umbilical cable connected to and proceeding from said connector means for conveying signals in said first main cable section to said repeater means and for conveying output signals generated by said repeater means therefrom to said second main cable section, said umbilical cable having a length sufficient so as to allow surface repair of said repeater means without thereby disturbing said main cable.

11. A submarine intermediate repeater station as recited in claim 10, wherein said connector means comprises a T-shaped branch sleeve having a first opening accepting said main cable input section therein, a second opening located axially with and opposite said first opening accepting said main cable output section therein, and a third opening located transverse to the axis of said first and second openings accepting therein said umbilical cable.

12. A submarine intermediate repeater station as recited in claim 10, wherein said repeater means is capable of repeating optical data signals.

13. In a submarine intermediate repeater station comprising a repeater and a main cable, an arrangement for the connection of said repeater to said main cable comprising:

a connector element in said main cable; and, an umbilical cable connected between said connector element and said repeater and carrying signal lines and supply lines between said main cable and said repeater and being of sufficient length so as to allow said repeater to be brought to the surface of the body of water under which said repeater is submersed without thereby disturbing said main cable.

* * * * *